July 31, 1928.

A. E. MAYNARD

EDGING MACHINE

Filed Oct. 16, 1919

1,679,224

Inventor

Albert E. Maynard.

By Harry H. Styll & Harold K. Parsons

Attorneys

Patented July 31, 1928.

1,679,224

UNITED STATES PATENT OFFICE.

ALBERT E. MAYNARD, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

EDGING MACHINE.

Application filed October 16, 1919. Serial No. 331,058.

This invention relates to improvements in machinery adapted for surfacing the edges of discs or similar articles of either circular or other form, and has particular reference to mechanism especially adapted for the edging of ophthalmic lenses or like articles.

The principal object of the present invention is the provision of novel and improved means for at all times accurately indicating the size to which the articles being operated upon have been surfaced.

A further object of the present invention is the provision of an improved device which may be applied to ordinary edging or like machines and which will serve to accurately measure and indicate the several dimensions of an irregular shaped article during the process of formation to assist in keeping track of the progress of the work and determine the mode of its completion.

Other objects and advantages of my improved construction should be apparent by reference to the following specification taken in connection with the accompanying drawings, and it will be understood that I may make any modifications in the specific details of construction shown and described within the scope of the appended claims without departing from or exceeding the spirit of my invention.

Figure I represents a fragmentary top or plan view of the invention applied to an edging machine.

Figure II is a section on line 2—2 of Figure I.

Prior to my present invention in the edging of lenses it has been customary to provide a screw with suitable scale or micrometer designations to indicate the in and out adjustment of the shoe, the size of lens being edged being determined by the adjustment of this screw. This, however, involved certain difficulties due to wear on the former, wear on the shoe and on the different portions of the machine, requiring careful adjustments of the several parts in order that the finally produced lens would be of exact correct size.

It is, therefore one of the purposes of the present invention to enable me to do away with this scale mechanism and in its place to substitute means which will enable me to at all times accurately and carefully determine the size of lens being constructed.

Figure 1:
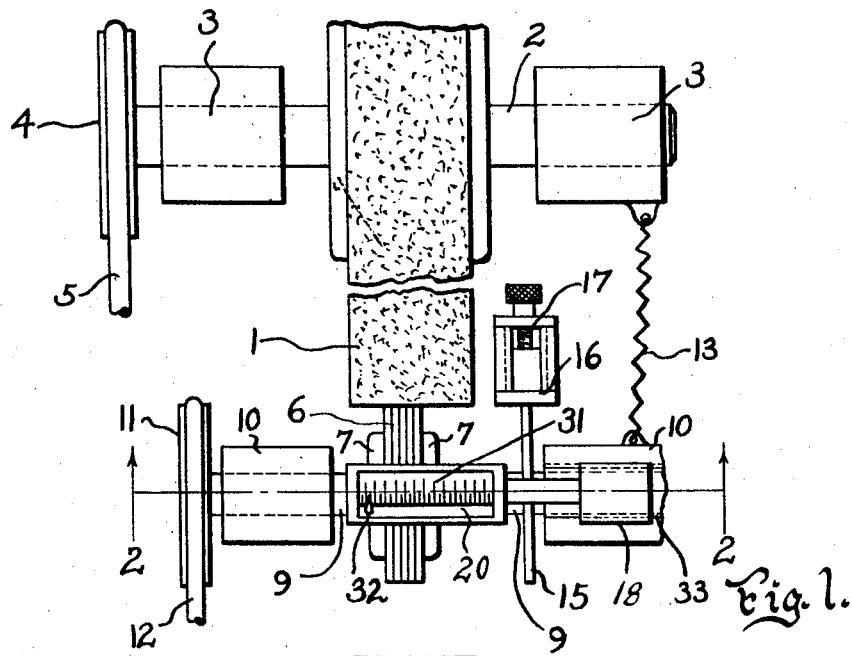
Figure 2:
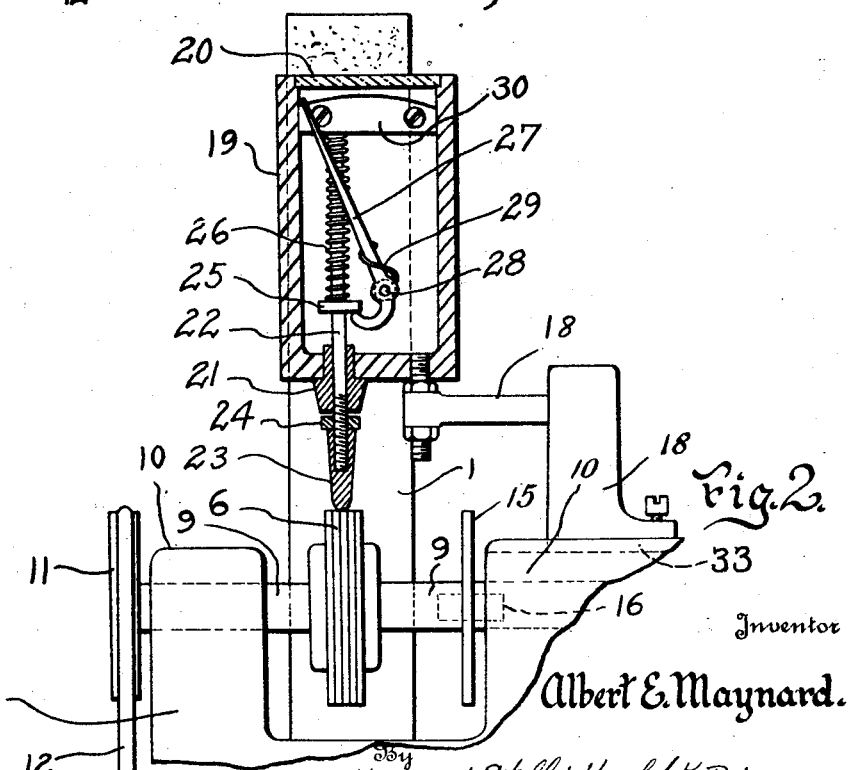

Referring to the drawings, a grindstone 1 mounted on a shaft 2 in the bearings 3 is rotated by a pulley 4 and a belt 5. The lenses or work 6 to be edged are held between the clamps 7 carried by the shafts 9 in the bearings 10. The shafts 9 are rotated as by the pulley 11 and belt 12. The lenses or work 6 are held in yielding contact with the edge of the grindstone 1 by means of the spring 13, the shafts 9 being carried in a member 14. The shape of the work is determined and governed by a shape plate or former 15 which contacts with the shoe 16 which is adjusted by the screw 17. Secured to the member 14 being supported by the arm 18 is the casing 19 which has a transparent top 20. Mounted in the bearings 21 is a plunger 22 to which is attached the contact member 23 which is threadedly adjustable thereon and held in adjusted position by the lock nut 24. The contact member 23 engages the edges of the work or lenses which are to be edged. On the plunger rod 22 is a collar 25 above which is mounted a spiral spring 26 which tends to hold the contact 23 yieldingly against the lenses or work. Pivotally mounted in the casing 19 is an indicator finger or hand 27 pivoted at 28. The end of the hand 27 beyond the pivot is arched around to contact with the under side of the collar 25, being held in constant engagement with the collar 25 by the spring 29. At the top of the casing 19 is a dial member 30 on top of which is located the scale 31, see Fig. 1. The top of the hand 27 is bent over to form the indicator 32. As the rod 22 is worked up and down in its bearings 21 by contact with the lenses or work the indicator hand 27 is operated by the collar 25 and the amount of movement is shown on the scale 31 registering with the indicator 32 of the hand 27.

The member 18 may be longitudinally moved on the slide 33 whereby the end of the contact 23 may be made to contact with any desired one of the lenses or work pieces in the clamps 7.

The dial will indicate, for a circular piece of work or lens, the diameter. For irregular shaped surfaces, such as oval and elliptical shapes, the major and minor axes will be indicated. The dial may be marked to indicate one-half of the major dimensions or may be made to read also for the whole diameter according to the system on which it is graduated.

To make the proper adjustment and to check up the scale of the dial a master form may be placed in the clamps 7 and this rotated in the carriage 14, from which it can be seen what the registrations are for the master form. If these correspond exactly with the dial scale it is clear that the setting of the machine is correct. If the readings of the known dimensions of the master form do not fall on the corresponding graduations of the scale adjustment can be made by adjusting the contact 23 with the lock nut 24 until the pointer registers the known dimension.

The progress of the work may be watched during the operation of the machine on the dial, or if it is desired to make tests at any particular point the power of the machine may be turned off and the shafts 9 rotated by hand. In this way there is a constant means of checking up both the accuracy of the indicator itself and the progress of the work and the same may be observed visually without interfering with the other work of the machine.

I claim:

1. In a device of the character described, lens clamps, means for rotating the lens clamps, a reciprocating rod adapted to engage the edge of a lens held in the lens clamps, a spring encircling the reciprocating rod, adapted to hold the rod against the edge of the lens, an extension on the reciprocating rod, a pivoted bell crank pointer member having a portion engaging the extension on the rod, an arm extending from the pivot on the side opposite from the portion engaging the rod, and a pointer point offset at right angles to the arm, an arcuate scale plate centered about the pivot of the pointer member and underlying the offset pointer, and indications on the scale under the pointer to indicate the movement of the pointer point when the rod is reciprocated.

2. In a device of the character described, lens clamps, means for rotating the lens clamps, a reciprocating member adapted to engage the edge of a lens held in the lens clamps, resilient means engaging the reciprocating member adapted to hold the reciprocating member against the edge of the lens, a contact member on the reciprocating member, a pivoted lever having a portion engaging the contact on the reciprocating member and a portion fashioned into an indicator pointer, and means to indicate the movement of the pointer when the reciprocating member is reciprocated.

In testimony whereof I have affixed my signature.

ALBERT E. MAYNARD.